(12) United States Patent
Katusic et al.

(10) Patent No.: US 7,553,465 B2
(45) Date of Patent: Jun. 30, 2009

(54) CERIUM OXIDE POWDER AND CERIUM OXIDE DISPERSION

(75) Inventors: Stipan Katusic, Kelkheim (DE);
Michael Kroell, Gelnhausen (DE);
Michael Kraemer, Schoeneck (DE);
Stefan Heberer, Gelnhausen (DE);
Edwin Staab, Geiselbach (DE);
Guenther Michael, Karlstein (DE)

(73) Assignee: Degussa AG, Duesseldorf (DE)

( * ) Notice: Subject to any disclaimer, the term of this patent is extended or adjusted under 35 U.S.C. 154(b) by 312 days.

(21) Appl. No.: 11/502,568

(22) Filed: Aug. 11, 2006

(65) Prior Publication Data

US 2007/0048205 A1    Mar. 1, 2007

Related U.S. Application Data

(60) Provisional application No. 60/708,401, filed on Aug. 16, 2005.

(30) Foreign Application Priority Data

Aug. 12, 2005  (DE)  ........................ 10 2005 038 136

(51) Int. Cl.
*B32B 19/00* (2006.01)
*B32B 15/02* (2006.01)
*B24B 1/00* (2006.01)
*C01F 1/00* (2006.01)

(52) U.S. Cl. .................. 423/263; 204/157.42; 423/178; 423/625; 428/375; 428/402; 106/286.1

(58) Field of Classification Search ................. 423/263, 423/178, 625, 222; 428/357, 402
See application file for complete search history.

(56) References Cited

U.S. PATENT DOCUMENTS

| | | | |
|---|---|---|---|
| 5,064,628 A | 11/1991 | Chane-Ching et al. | |
| 6,602,111 B1 * | 8/2003 | Fujie et al. | 451/36 |
| 6,663,683 B2 | 12/2003 | Lortz et al. | |
| 6,676,719 B2 | 1/2004 | Lortz et al. | |
| 6,767,377 B2 * | 7/2004 | Schumacher et al. | 51/308 |
| 6,808,769 B2 | 10/2004 | Batz-Sohn et al. | |
| 6,887,566 B1 * | 5/2005 | Hung et al. | 428/357 |
| 6,991,190 B2 | 1/2006 | Lortz et al. | |
| 7,015,270 B2 | 3/2006 | Scharfe et al. | |
| 7,169,322 B2 | 1/2007 | Menzel et al. | |
| 7,374,787 B2 | 5/2008 | Lortz et al. | |
| 7,470,423 B2 | 12/2008 | Lortz et al. | |
| 2004/0240062 A1 | 12/2004 | Lortz et al. | |
| 2005/0036928 A1 | 2/2005 | Katusic et al. | |
| 2005/0074610 A1 | 4/2005 | Kroll et al. | |
| 2005/0169861 A1 | 8/2005 | Lortz et al. | |
| 2006/0104881 A1 | 5/2006 | Lortz et al. | |
| 2006/0163533 A1 | 7/2006 | Batz-Sohn et al. | |
| 2006/0193764 A1 | 8/2006 | Katusic et al. | |
| 2007/0048205 A1 | 3/2007 | Katusic et al. | |
| 2008/0051473 A1 | 2/2008 | Lortz et al. | |
| 2008/0098932 A1 | 5/2008 | Perlet et al. | |
| 2008/0264299 A1 | 10/2008 | Lortz et al. | |

FOREIGN PATENT DOCUMENTS

EP   1 506 940 A1   2/2005
WO   WO 01/36332 A1   5/2001

OTHER PUBLICATIONS

U.S. Appl. No. 60/405,739, filed Aug. 26, 2002, Lortz, et al.
U.S. Appl. No. 11/722,122, filed Jun. 19, 2007, Oswald, et al.
U.S. Appl. No. 12/097,300, filed Jun. 13, 2008, Lortz, et al.
U.S. Appl. No. 11/910,668, filed Mar. 8, 2006, Kroll, et al.
U.S. Appl. No. 60/708,401, filed Aug. 16, 2005, Katusic, et al.
U.S. Appl. No. 60/940,908, filed May 30, 2007, Kroell, et al.
U.S. Appl. No. 12/271,414, filed Nov. 14, 2008, Wursche, et al.

* cited by examiner

*Primary Examiner*—Melvin C Mayes
*Assistant Examiner*—Colette Nguyen
(74) *Attorney, Agent, or Firm*—Oblon, Spivak, McClelland, Maier & Neustadt, P.C.

(57) ABSTRACT

Cerium oxide powder having carbonate groups and made of crystalline primary particles containing cerium oxide and having carbonate groups on the surface and in a region close to the surface, and having a BET surface area of from 25 to 150 m$^2$/g, a mean diameter of from 5 to 50 nm, a carbonate concentration in the region close to the surface decreasing inwardly from the surface, a carbon content due to carbonate groups on the surface of from 5 to 50% by area, a carbon content due to carbonate groups at a depth of about 5 nm in a region close to the surface of from 0 to 30% by area, a content of cerium oxide calculated as CeO$_2$ and based on the powder of at least 99.5% by weight and a content of organic and inorganic carbon of from 0.01 to 0.3% by weight. A dispersion containing this powder.

28 Claims, 1 Drawing Sheet

CERIUM OXIDE POWDER AND CERIUM OXIDE DISPERSION

BACKGROUND OF THE INVENTION

1. Field of the Invention

The invention relates to a powder based on cerium oxide, a process for preparing the powder, and uses of the powder. The invention further relates to a dispersion containing the powder.

2. Description of the Related Art

Cerium oxide is a significant constituent of catalysts. Furthermore, cerium oxide is an important material for the polishing of glass and electronic components. Particularly in the field of chemomechanical polishing, the journal and patent literature describes numerous ways for improving the properties of cerium oxide powders and of cerium oxide dispersions.

Cerium oxide is usually prepared by calcination of cerium hydroxides or cerium carbonates. The calcined oxides are then milled and sieved to form powders.

Wet-chemical routes and gas-phase processes for preparing cerium oxide are also known. Cerium oxide can be prepared by hydrothermal synthesis, as described, for example, in U.S. Pat. No. 5,389,352. Here, cerium(III) salts are converted oxidatively at elevated temperature and pressure into cerium oxide which crystallizes out in the form of fine particles.

Gas-phase processes such as spray pyrolysis methods in which a cerium oxide precursor, usually in the form of an aerosol, is oxidized in a flame are of particular interest. One such method is described in U.S. published application 2001036437.

In J. Mater. Res., Vol. 17, pages 1356-1362 (2002), Pratsinis et al. describe the preparation of cerium oxide powders of high crystallinity by flame spray pyrolysis of cerium acetate solutions in solvent mixtures comprising acetic acid, isooctane and 2-butanol by oxidation by means of oxygen in an oxygen/methane flame. The solvent mixture is essential to the preparation of a cerium oxide powder which is free of relatively coarse particles.

U.S. published application 2004126298 describes a process for preparing metal oxides, in which droplets are produced from a solution and these are oxidized in a flame. The solution contains at least one starting material and at least 60%, based on the total solution, of a carboxylic acid as solvent.

A process for preparing cerium oxide comprising coarse and fine material is known from U.S. Pat. No. 6,887,566. This process discloses the combustion of an aerosol of a cerium oxide precursor in a high-temperature zone of 700-1,100 K.

DE-A-10251029 discloses a pyrogenic cerium oxide powder having a coarse fraction comprising crystalline, nonaggregated particles having a mean diameter of from 30 to 200 nm and a fine fraction in the form of aggregates of finely crystalline, grown-together primary particles having a mean aggregate diameter of from 5 to 50 nm and a BET surface area of from 15 to 200 m$^2$/g.

U.S. published application 2005036928 discloses a polycrystalline cerium oxide powder in the form of aggregates of primary particles having a specific surface area of from 70 to 150 m$^2$/g, a mean primary particle diameter of from 5 to 20 nm and a mean, projected aggregate diameter of from 20 to 100 nm and a dispersion containing this cerium oxide powder. Furthermore, numerous dispersions containing cerium oxide for chemomechanical polishing are described.

U.S. Pat. No. 6,663,683 discloses an aqueous dispersion containing pyrogenic silicon dioxide doped with cerium oxide, with the cerium oxide being introduced via an aerosol of a cerium salt solution or suspension and the mean particle size in the dispersion being less than 100 nm.

U.S. Pat. No. 6,767,377 discloses an aqueous dispersion which contains particles having a core of doped, pyrogenic low-structured silicon dioxide and a cerium oxide shell and does not exceed a mean secondary particle size of 0.2 µm.

U.S. published application 2005074610 discloses a dispersion of pyrogenic cerium oxide which does not have any particles larger than 1 µm.

U.S. Pat. No. 6,827,752 describes a cerium oxide dispersion which is stabilized by polyacrylates.

U.S. Pat. No. 6,443,811 describes a cerium oxide dispersion in a neutral to weakly basic medium which contains a cationic surface-active agent.

U.S. Pat. No. 6,420,269 describes a cerium oxide dispersion which has a pH in the range from 8 to 12 and contains a dispersant, preferably a water-soluble organic polymer, a water-soluble anionic or nonionic surface-active agent or a water-soluble amine.

A disadvantage of the cerium oxide dispersions according to the prior art is that satisfactory stability in the neutral to weakly alkaline range can be achieved only in the presence of additives.

SUMMARY OF THE INVENTION

It is therefore an object of the present invention to provide a dispersion which is based on cerium oxide and is, without additional additives, sufficiently stable in the neutral to weakly alkaline range to be able to be used for chemomechanical polishing.

A further object of the invention is to provide a powder based on cerium oxide.

A further object is to provide a process for preparing a powder based on cerium oxide.

A further object of the invention is to provide a method of polishing a substrate with a dispersion of a powder based on cerium oxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
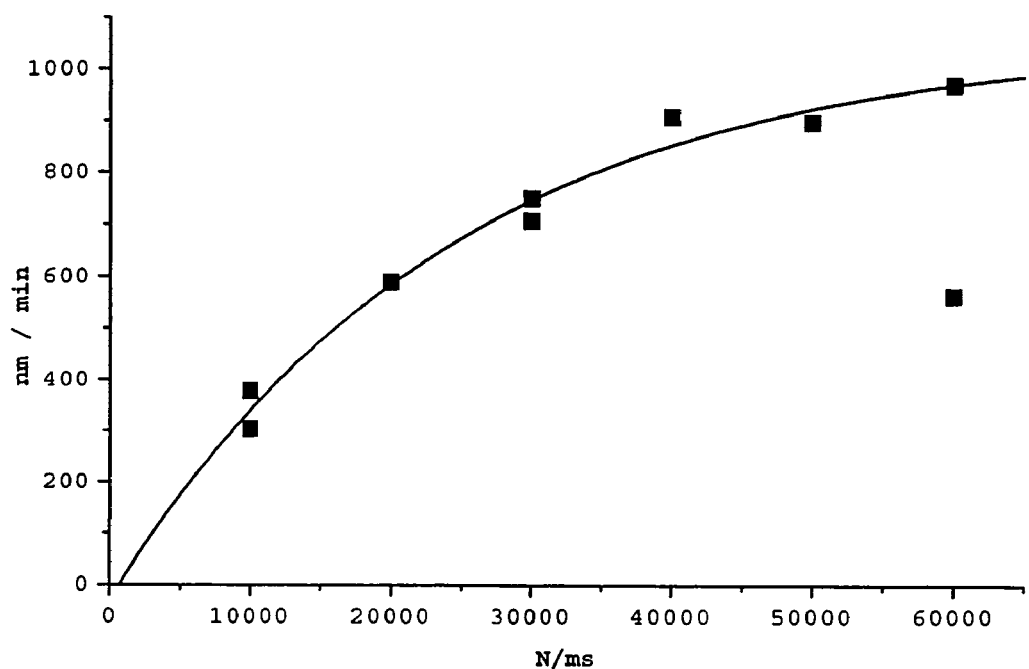
FIG. 1 shows the removal rate of polishing as a function of contact pressure and velocity.

In one aspect, the invention provides a cerium oxide powder which, in one embodiment, has carbonate groups and comprises crystalline primary particles which contain cerium oxide and have carbonate groups on the surface of the crystalline primary particles and in a region close to the surface of the crystalline primary particles, wherein the powder has a BET surface area of from 25 to 150 m$^2$/g;

the primary particles have a mean diameter of from 5 to 50 nm;

the region close to the surface of the primary particles is at a depth of about 5 nm from the surface of the primary particles;

the carbonate concentration in the region close to the surface decreases inwards from the surface on which the carbonate concentration is highest;

the carbon content due to the carbonate groups on the surface is from 5 to 50% by area and that at a depth of about 5 nm in the region close to the surface is from 0 to 30% by area;

the content of cerium oxide, calculated as $CeO_2$ and based on the powder, is at least 99.5% by weight; and the content of carbon, encompassing organic and inorganic carbon, is from 0.01 to 0.3% by weight, based on the total weight of the cerium oxide powder.

The carbonate groups in the powder of the invention can be detected both on the surface and also in a region at a depth of up to about 5 nm from the surface of the primary particles. The carbonate groups are chemically bound, e.g., chemically bound to cerium and/or cerium oxide, and can, for example, be present in the structures a-c.

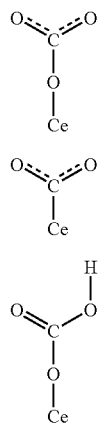

The carbonate groups can, for example, be detected by XPS/ESCA analysis. To detect the carbonate groups in the region close to the surface, a part of the surface can be removed by means of argon ion bombardment to expose the region close to the surface and thereby form a new surface. The resulting new surface can likewise be analysed by means of XPS/ESCA (XPS=X-ray photoelectron spectroscopy; ESCA=electron spectroscopy for chemical analysis). Using this method the carbonate concentration at different depths from the surface of the particle can be calculated on a % by area basis.

In embodiments, the primary particles of the powder of the invention can be present in isolated form, be more or less strongly aggregated, or be a combination of isolated and aggregated. The primary particles are preferably very largely in aggregated form. Preferably at least 50% of the primary particles are in an aggregated form, more preferably at least 70%, even more preferably at least 80%, more preferably at least 90%, most preferably at least 95% of the primary particles are in aggregated form.

The powder of the invention can preferably have a proportion of sodium of <5 ppm and of chlorine of <20 ppm. The elements mentioned can generally be tolerated only in small amounts in chemomechanical polishing. More preferably, the powder of the invention has less than 4 ppm, more preferably less than 3 ppm, more preferably less than 2 ppm and most preferably less than 1 ppm of sodium based on the total weight of the powder. Preferably the powder of the invention has less than 10 ppm of chlorine, more preferably less than 5 ppm chlorine, even more preferably less than 2 ppm of chlorine based on the total weight of the powder.

Furthermore, a BET surface area of from 30 to 100 $m^2/g$ is preferred for the powder of the invention. A BET surface area of 40-80 $m^2/g$ is particularly preferred for polishing applications.

The invention further provides a process for preparing a cerium oxide-based powder having carbonate groups, in which an aerosol is reacted with an oxygen-containing gas at a reaction temperature of from 600° C. to 1500° C., preferably from 900° C. to 1200° C., more preferably from 1050° C. to 1150° C., in a reaction chamber, the reaction mixture is cooled and the powder is subsequently separated off from the gaseous substances by means of a filter, with the aerosol being obtained by atomization of at least one solution containing an organic solvent or solvent mixture and an oxidizable, organic cerium(III) compound dissolved therein by means of at least one atomization gas and the volume-based, mean droplet diameter $D_{30}$ of the aerosol being from 30 to 100 μm and the mean residence time in the reaction chamber being from 0.1 s to 5 s, wherein the reaction mixture is cooled after leaving the reaction chamber by spraying water droplets into it, the water droplets have a mean, volume-based droplet diameter of less than 100 μm and to generate the water droplets, water is added in an amount according to equation I $$m_{H2O}=[cp_{liq}*(T_b-T_0)+dh_v+cp_g*(T_e-T_b)]/3600*Q \qquad (I)$$

where

Q=total combustion enthalpy of all starting materials in KW $m_{H2O}$=amount of $H_2O$ in kg/h required to achieve the end temperature $T_e$ $T_0$=inlet temperature of water $T_b$=boiling point of water at 1 bar $T_e$=end temperature $dh_v$=enthalpy of vaporization of water $cp_{liq}$=heat capacity of water at 50° C.

$cp_g$=heat capacity of water vapour at 150° C., and $T_0$=5-50° C., $T_b$=100° C., $T_e$=200-400° C., $dh_v$=2256.7 kJ/kg, $cp_{liq}$=4.181 kJ/kg*K and $cp_g$=1.98 kJ/kg*K.

The oxygen-containing gas is generally air or air enriched with oxygen.

As the atomization gas, it is possible to use a reactive gas such as air, air enriched with oxygen and/or an inert gas such as nitrogen in embodiments of the process of the invention. In general, air is used as atomization gas. The ratio of throughput of the cerium(III) solution/amount of atomization gas is preferably from 0.1 to 25 kg/standard $m^3$ and particularly preferably from 0.5 to 5 kg/standard $m^3$. One or more two-fluid or multifluid nozzles are particularly suitable for atomization. The atomization pressure is generally from 1 to 100 bar.

In a preferred embodiment of the process of the invention, a fuel gas is additionally added to the reaction mixture. Suitable fuel gases include, e.g., hydrogen, methane, ethane, propane, butane, and natural gas. The amount of fuel gas added depends first and foremost on the amount of the solution containing the cerium(III) compound added, its composition and joule value. In general, the ratio of fuel gas/solution is from 0.1 to 2 standard m$^3$/kg.

It can also be advantageous for secondary air to be additionally introduced into the reaction chamber. In general, the amount of secondary air will be such that the ratio of secondary air to primary air is from 0.1 to 10.

The process of the invention can preferably be carried out so that the proportion of oxygen in the amount of oxygen-containing gas introduced is greater than that necessary for complete reaction of the cerium(III) compound and the fuel gas. It is particularly advantageous for lambda to be $\geq 1.5$, with lambda being calculated from the sum of oxygen in (air+if appropriate atomization gas)/sum of (cerium(III) compound+fuel gas), in each case in mol/h. Very particular preference is given to 2<lambda<5.

As organic cerium(III) compounds, it is possible to use, e.g., in particular, cerium alkoxides and/or cerium carboxylates. As alkoxides, preference is given to using ethoxides, n-propoxides, isopropoxides, n-butoxides and/or tert-butoxides. As carboxylates, it is possible to use compounds based on acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid and/or lauric acid. It can be particularly advantageous to use 2-ethylhexanoates and/or laurates.

As organic solvents or as constituents of organic solvent mixtures, preference is given to using alcohols such as methanol, ethanol, n-propanol, isopropanol, n-butanol or tert-butanol, diols such as ethanediol, pentanediol, 2-methyl-2,4-pentanediol, dialkyl ethers such as diethyl ether, tert-butyl methyl ether or tetrahydrofuran, $C_1$-$C_{12}$-carboxylic acids such as acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid, lauric acid. Furthermore, it is possible to use ethyl acetate, benzene, toluene, naphtha and/or petroleum spirit. Preference is given to using solutions containing $C_2$-$C_{12}$-carboxylic acids, in particular 2-ethylhexanoic acid and/or lauric acid.

The invention further provides a cerium oxide powder which has carbonate groups and is obtainable by the process of the invention.

The invention further provides a dispersion containing the cerium oxide powder having carbonate groups according to the invention.

The liquid phase of the dispersion can be water, one or more organic solvents or an aqueous/organic combination, with the phases preferably being miscible. The dispersion can additionally contain one or more of pH regulators, surface-active additives and/or preservatives. However, a dispersion containing surface-active additives is not advantageous. Instead, a dispersion which consists of only the cerium oxide powder having carbonate groups, water and optionally a pH regulator is advantageous.

The content of the cerium oxide powder containing carbonate groups in the dispersion can preferably be from 0.5 to 60% by weight. Particular preference is given to an aqueous dispersion containing from 20 to 50% by weight, in particular from 35 to 45% by weight, of the powder of the invention. Furthermore, an aqueous dispersion according to the invention which has a viscosity of <30 mPas, particularly preferably <20 mPas, at a concentration of the powder of up to 40% by weight and a temperature of 23° C. in a shear rate range from 1 to 1000$^{s-1}$ can be preferred.

The pH of an aqueous dispersion according to the invention is preferably in the range from 3 to 8. To store the dispersion, a pH of from 3 to 4 is usually set by addition of an acid. Nitric acid is particularly useful for this purpose. The stability of the dispersion is particularly high in this pH range.

When an aqueous dispersion is used as a polishing agent, a pH of from 7 to 8 is preferred and can be set, for example, by means of ammonia or potassium hydroxide. The dispersion displays satisfactory stability in this range, even without the presence of surface-active additives.

A dispersion whose mean particle size $d_{50}$, determined by means of dynamic light scattering, is less than 120 nm, in particular less than 100 nm, is especially suitable for polishing processes.

Furthermore, a dispersion whose mean particle size $d_{90}$, determined by means of dynamic light scattering, is less than 200 nm, in particular less than 150 nm, is suitable for this purpose.

The zeta potential of the dispersion of the invention is preferably at least 20 mV, in particular greater than 30 mV.

The dispersion of the invention can be produced by means of dispersing apparatuses known to those skilled in the art. These can be, for example, rotor-stator machines, high-energy mills in which the particles are milled by collision with one another, planetary kneaders, stirred ball mills, vibratory ball mills, shaking tables, ultrasonic apparatuses or combinations of the abovementioned apparatuses.

EXAMPLES

The specific surface area is determined in accordance with DIN 66131, incorporated herein by reference in its entirety.

The surface properties are determined by large-area (1 cm$^2$) XPS/ESCA analysis (XPS=X-ray photoelectron spectroscopy; ESCA=electron spectroscopy for chemical analysis). Evaluation is based on the general recommendations in the DIN specialist report No. 39, DMA(A)97, incorporated herein by reference in its entirety, of the National Physics Laboratory, Teddington, UK, and the previous findings on development-accompanying standardization of the working committee "Oberflächen- und Mikrobereichsanalysen" NMP816(DIN), incorporated herein by reference in its entirety. In addition, the comparative spectra available for the particular case from the specialist literature are taken into account. The values are calculated by background subtraction taking into account the relative sensitivity factors of the electron levels indicated in each case. The results are reported in percent by area. The accuracy is estimated as +/−5% relative.

The zeta potential is determined in the pH range 3-12 by means of the electrokinetic sound amplitude (ESA). For this purpose, a suspension containing 1% of cerium oxide is prepared. Dispersion is carried out by means of an ultrasonic rod (400 W). The suspension is stirred by means of a magnetic stirrer and pumped by means of a peristaltic pump through the PPL-80 sensor of the ESA-8000 instrument from Matec. From the starting pH value, the potentiometric titration is carried out using 5M NaOH to pH 12. The backtitration to pH 4 is carried out using 5M HNO$_3$. Evaluation is carried out by means of the instrument software version pcava 5.94.

$$\zeta = \frac{ESA \cdot \eta}{\phi \cdot \Delta\rho \cdot c \cdot |G(\alpha)| \cdot \varepsilon \cdot \varepsilon_r}$$

where $\zeta$ zeta potential
$\phi$ volume fraction
$\Delta\rho$ density difference between particles and liquid
c velocity of sound in the suspension η viscosity of the liquid ∈ dielectric constant of the suspension

|G(α)| Inertia correction

The dispersions are produced by ultrasound treatment in water using an ultrasonic finger (Bandelin UW2200/DH13G), setting 8, 100%; 5 minutes). The mean aggregate diameters are determined by means of a particle size analyser LB-500 from Horiba.

Example 1:

An aerosol produced from 250 kg/h of a solution comprising 50% by weight of cerium(III) ethylhexanoate and 50% by weight of 2 ethylhexanoic acid joule value of the solution: 29 kJ/kg), and 50 standard m$^3$/h of atomization air was atomized into a reaction chamber by means of a two-fluid nozzle (from Schlick). Here, a hydrogen/oxygen flame composed of hydrogen (40 standard m$^3$/h) and primary air (1800 standard m$^3$/h) was burned and the aerosol was reacted in this. In addition, secondary air (3200 standard m$^3$/h) was introduced into the reaction chamber. The residence time in the flame was about 20 ms. The temperature 0.5 m below the flame was 1100° C.

An aerosol produced from 900 kg/h of water was subsequently sprayed into the reaction chamber by means of a two-fluid nozzle using 200 standard m$^3$/h of atomization air at an inlet temperature of 20° C. The solid product was separated off from gaseous substances on a filter. The reaction mixture had a temperature of 280° C. at this point in time. The residence time of the reaction mixture in the reaction chamber was 1 s.

Examples 2 to 4 were carried out in a manner analogous to Example 1, with the amounts used and other process parameters being shown in Table 1. The analytical data for the powders obtained are shown in Table 2.

The results of the XPS/ESCA analysis show that very pure surfaces are present. Apart from Ce, C and O, no further elements are detectable. The carbonate C displays a bond energy of about 289 eV.

Furthermore, the $d_{50}$ and $d_{90}$ values of the 1% dispersions of the powders from Examples 1 to 4 are shown in Table 2.

The particle size distribution of a 5% dispersion of the powder from Example 3 in water whose pH has been set to 3.9 by means of HNO$_3$ gave a $d_{50}$ of 82 nm and a $d_{90}$ of 103 nm.

SiO$_2$ surfaces can be polished using the dispersion according to the invention and removal rates of >500 nm/min, preferably up to 1,200 nm/min, in particular 1,000 nm/min, at a pv of 60,000 N/ms are achieved.

Figure 2:
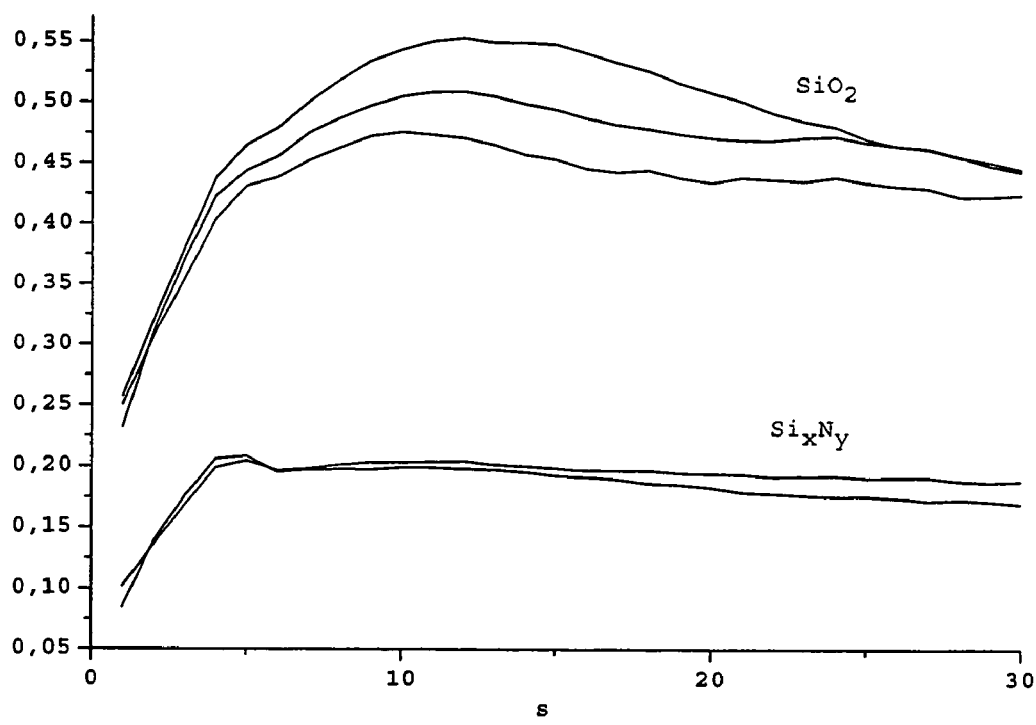
FIG. 2 shows the motor current of a polishing process as a function of time for $SiO_2$ and $Si_3N_4$.

FIG. 1 and FIG. 2 show polishing results of a 0.5% dispersion of the powder from Example 3 whose pH has been set to 7.6 by means of KOH.

FIG. 1 shows the removal rate, in nm/min, as a function of the product of contact pressure and velocity, in N/ms.

In addition, it was found that the motor currents measured in the polishing of SiO$_2$ and Si$_3$N$_4$ differed from one another when the dispersion according to the invention was used. This can be advantageously utilized in STI (shallow trench isolation). The objective of STI is to polish SiO$_2$ very selectively and to stop the polishing process when the nitride layer is reached. It is known that additives which increase this selectivity by protecting the nitride can be added to a dispersion for this purpose. Surprisingly, these additives are not necessary in the case of the dispersion of the invention.

FIG. 2 shows the motor current as a function of time in s for SiO$_2$ and Si$_3$N$_4$.

TABLE 1

Amounts used and settings

| | | Example | | | |
|---|---|---|---|---|---|
| | | 1 | 2 | 3 | 4 |
| Cerium(III) solution | kg/h | 250 | 2.5 | 12 | 14 |
| Atomization air* | Standard m$^3$/h | 50 | 3 | 20 | 20 |
| Hydrogen | Standard m$^3$/h | 40 | 2 | 4 | 4.5 |
| Primary air | Standard m$^3$/h | 1800 | 10 | 110 | 110 |
| Secondary air | Standard m$^3$/h | 3200 | 25 | 160 | 160 |
| Total air | Standard m$^3$/h | 5050 | 28 | 290 | 290 |
| Total oxygen | Standard m$^3$/h | 1058 | 5.86 | 60 | 60 |
| Lambda | | 2.7 | 3 | 3 | 2.6 |
| Temperature** | ° C. | 1100 | 1110 | 1060 | 1055 |
| Residence time | s | 1 | 1.4 | 0.9 | 0.95 |
| Water | kg/h | 900 | 10 | 100 | 110 |
| Atomization air*** | Standard m$^3$/h | 200 | 5 | 30 | 50 |
| Temperature T$_0$ | ° C. | 20 | 20 | 20 | 20 |
| Temperature T$_e$ | ° C. | 280 | 310 | 300 | 290 |

*Cerium(III) solution;
**500 mm under the flame;
***water.

TABLE 2

Analytical values for the powders according to the invention

| | | Example | | | |
|---|---|---|---|---|---|
| | | 1 | 2 | 3 | 4 |
| BET | m$^2$/g | 120 | 60 | 58 | 25 |
| CeO$_2$* | % by wt | 99.85 | 99.79 | 99.82 | 99.8 |
| C | % by wt | 0.12 | 0.14 | 0.1 | 0.15 |
| Zeta potential** | mV | 41 | 48 | 52 | 46 |
| IEP*** | pH | 9 | 9.6 | 10.6 | 9.8 |
| C 1s**** | % by area | 28.7/26.4 | 19.0/11.2 | 15.2/5.9 | 27.4/11.8 |
| $d_{50}$ | nm | 105 | 110 | 114 | 110 |
| $d_{90}$ | nm | 175 | 185 | 198 | 180 |

*in all examples: Na<5 ppm; Cl<20 ppm;
**at pH = 4;
***IEP = isoelectric point;
****as synthesized/sputtered; sputtered: after removal of the surface by bombardment with argon ions, 5 keV, about 10 min.

The entire contents of U.S. provisional application No. 60/708,401 are incorporated herein by reference. The entire contents of German application no. DE 102005038136.7 are incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A cerium oxide powder, consisting of:
crystalline primary particles comprising cerium oxide and having carbonate groups on the surface of the crystalline primary particles and in a region close to the surface of the crystalline primary particles, wherein
the powder has a BET surface area of from 25 to 150 m$^2$/g,
the crystalline primary particles have a mean diameter of from 5 to 50 nm, the region close to the surface of the crystalline primary particles is about 5 nm deep from the surface of the crystalline primary particles, the carbonate concentration in the region close to the surface of the crystalline primary particles decreases inwards from the surface on which the carbonate concentration is highest, the carbon content due to the carbonate groups on the surface of the crystalline primary particles is from 5 to 50% by area and the carbon content in the region at a depth of about 5 nm from the surface of the crystalline primary particles is from 0 to 30% by area, the content of cerium oxide, calculated as $CeO_2$ and based on the total weight of the powder, is at least 99.5% by weight and the content of carbon, encompassing organic and inorganic carbon, is from 0.01 to 0.3% by weight, based on the total weight of the powder.

2. The cerium oxide powder according to claim 1, wherein the primary particles are aggregated.

3. The cerium oxide powder according to claim 1, wherein the at least 80% of the crystalline primary particles are aggregated.

4. The cerium oxide powder according to claim 1, wherein the at least 95% of the crystalline primary particles are aggregated.

5. The cerium oxide powder according to claim 1, wherein sodium is present in an amount of <5 ppm and chlorine is present in an amount of <20 ppm based on the total amount of the powder.

6. The cerium oxide powder according to claim 1, having a BET surface area of from 30 to 100 $m^2/g$.

7. A process for preparing a cerium oxide powder having carbonate groups, comprising:

forming an aerosol having a volume-based mean droplet diameter $D_{30}$ of from 30 to 100 μm, by atomizing at least one solution consisting of an organic solvent or a solvent mixture, and an oxidizable, organic cerium (III) compound dissolved therein with at least one atomization gas, reacting the aerosol with an oxygen-containing gas at a reaction temperature of from 600° C. to 1,500° C., in a reaction chamber to form a reaction mixture comprising a mixture of a powder and one or more gaseous substances, wherein the mean residence time of the aerosol in the reaction chamber is from 0.1 s to 5 s;

cooling the reaction mixture after the reaction mixture leaves the reaction chamber by spraying water droplets having a mean volume-based droplet diameter of less than 100 μm into the reaction mixture; wherein the water droplets are prepared by mixing water with the reaction mixture in an amount according to equation I $$m_{H2O}=[cp_{liq}*(T_b-T_0)+dh_v+cp_g*(T_e-T_b)]/3,600*Q \quad (I)$$

where

Q=total combustion enthalpy of all starting materials in KW $m_{H2O}$=amount of $H_2O$ in kg/h required to achieve the end temperature $T_e$ $T_0$=inlet temperature of water $T_b$=boiling point of water at 1 bar $T_e$=end temperature $dh_v$=enthalpy of vaporization of water $cp_{liq}$=heat capacity of water at 50° C.

$cp_g$=heat capacity of water vapour at 150° C., and $T_0$=5-50° C., $T_b$=100° C., $T_e$=200-400° C., $dh_v$=2,256.7 kJ/kg, $cp_{liq}$=4.181 kJ/kg*K and $cp_g$=1.98 kJ/kg*K; and subsequently separating the powder from the gaseous substances with a filter; and wherein the organic solvent is 2-ethylhexanoic acid and/or lauric acid, the oxidizable, organic cerium (III) compound is a 2-ethylhexanoate and or laurate, and a ratio of throughput of the cerium (III) solution/amount of atomization gas is from 0.5 to 5 kg/standard $m^3$.

8. The process according to claim 7, further comprising:
adding a fuel gas to the reaction mixture before or during the reacting.

9. The process according to claim 7, wherein lambda is ≧1.5, wherein lambda is calculated from the sum of oxygen in (air+atomization gas)/sum of (cerium (III) compound+fuel gas), in each case in mol/h.

10. A cerium oxide powder having carbonate groups obtained by the process of claim 7.

11. A dispersion comprising the cerium oxide powder according to claim 1.

12. The dispersion according to claim 11, comprising only the cerium oxide powder, water and optionally a pH regulator.

13. The dispersion according to claim 11, comprising only the cerium oxide powder, water and a pH regulator.

14. The dispersion according to claim 11, wherein the content of cerium oxide powder is from 0.5 to 60% by weight based on the total weight of the powder.

15. The dispersion according to claim 11, having a pH of from 3 to 8.

16. The dispersion according to claim 11, having a mean particle size $d_{50}$, determined by means of dynamic light scattering, of less than 120 nm.

17. The dispersion according to claim 11, having a mean particle size $d_{90}$, determined by means of dynamic light scattering, of less than 200 nm.

18. The dispersion according to claim 11, having a zeta potential of at least 20 mV.

19. A process comprising:
chemomechanically polishing a surface with a composition comprising the cerium oxide powder according to claim 1.

20. A process comprising:
chemomechanically polishing a surface with the dispersion of claim 11.

21. A catalyst comprising the cerium oxide powder according to claim 1.

22. A UV absorber comprising the cerium oxide power according to claim 1.

23. A toner comprising the cerium oxide powder according to claim 1.

24. A fuel cell comprising the cerium oxide powder according to claim 1.

25. The cerium oxide powder according to claim 1, wherein the crystalline primary particles comprises at least 99% of cerium oxide based on the total weight of the crystalline primary particles.

26. A cerium oxide powder, comprising:
crystalline primary particles comprising cerium oxide and having carbonate groups on the surface of the crystalline primary particles and in a region close to the surface of the crystalline primary particles, wherein the powder has a BET surface area of from 25 to 150 $m^2/g$, the crystalline primary particles have a mean diameter of from 5 to 50 nm, the region close to the surface of the crystalline primary particles is about 5 nm deep from the surface of the crystalline primary particles, the carbonate concentration in the region close to the surface of the crystalline primary particles decreases inwards from the surface on which the carbonate concentration is highest, the carbon content due to the carbonate groups on the surface of the crystalline primary particles is from 5 to 50% by area and the carbon content in the region at a depth of about 5 nm from the surface of the crystalline primary particles is from 0 to 30% by area, the content of cerium oxide, calculated as $CeO_2$ and based on the total weight of the powder, is at least 99.5% by weight and the content of carbon, encompassing organic and inorganic carbon, is from 0.01 to 0.3% by weight, based on the total weight of the powder.

27. A polishing agent, comprising:

the dispersion of claim 11, having a pH of 7 to 8 and having no surface active additive.

28. The cerium oxide powder according to claim 26, obtained by a process comprising:

forming an aerosol having a volume-based mean droplet diameter $D_{30}$ of from 30 to 100 μm, by atomizing at least one solution consisting of an organic solvent or a solvent mixture, and an oxidizable, organic cerium (III) compound dissolved therein with at least one atomization gas, reacting the aerosol with an oxygen-containing gas at a reaction temperature of from 600° C. to 1,500° C., in a reaction chamber to form a reaction mixture comprising a mixture of a powder and one or more gaseous substances, wherein the mean residence time of the aerosol in the reaction chamber is from 0.1 s to 5 s;

cooling the reaction mixture after the reaction mixture leaves the reaction chamber by spraying water droplets having a mean volume-based droplet diameter of less than 100 μm into the reaction mixture; wherein the water droplets are prepared by mixing water with the reaction mixture in an amount according to equation I $$m_{H2O} = [cp_{liq}*(T_b-T_0)+dh_v+cp_g*(T_e-T_b)]/3,600*Q \qquad (I)$$

where

Q=total combustion enthalpy of all starting materials in KW $m_{H2O}$=amount of $H_2O$ in kg/h required to achieve the end temperature $T_e$ $T_0$=inlet temperature of water $T_b$=boiling point of water at 1 bar $T_e$=end temperature $dh_v$=enthalpy of vaporization of water $cp_{liq}$=heat capacity of water at 50° C.

$cp_g$=heat capacity of water vapour at 150° C., and $T_0$=5-50° C., $T_b$=100° C., $T_e$=200-400° C., $dh_v$=2,256.7 kJ/kg, $cp_{liq}$=4.181 kJ/kg*K and $cp_g$=1.98 kJ/kg*K; and subsequently separating the powder from the gaseous substances with a filter; and wherein the organic solvent is 2-ethylhexanoic acid and/or lauric acid, the oxidizable, organic cerium (III) compound is a 2-ethylhexanoate and or laurate, and a ratio of throughput of the cerium (III) solution/amount of atomization gas is from 0.5 to 5 kg/standard m³.

* * * * *